United States Patent
Tourneix et al.

(10) Patent No.: US 11,920,064 B2
(45) Date of Patent: Mar. 5, 2024

(54) METHOD FOR MANUFACTURING STOPPERS INTENDED FOR BOTTLING STILL WINES AND CORRESPONDING STOPPERS

(71) Applicant: DIAM BOUCHAGE, Ceret (FR)

(72) Inventors: Dominique Tourneix, Saint Esteve (FR); Moaad Bakali, Badajoz (ES)

(73) Assignee: DIAM BOUCHAGE, Ceret (FR)

( * ) Notice: Subject to any disclaimer, the term of this patent is extended or adjusted under 35 U.S.C. 154(b) by 0 days.

(21) Appl. No.: 17/489,384

(22) Filed: Sep. 29, 2021

(65) Prior Publication Data
US 2022/0097254 A1    Mar. 31, 2022

(30) Foreign Application Priority Data
Sep. 29, 2020   (EP) ..................... 20306118

(51) Int. Cl.
| | | |
|---|---|---|
| *C09J 5/02* | (2006.01) | |
| *B27J 5/00* | (2006.01) | |
| *B27K 7/00* | (2006.01) | |
| *B65D 39/00* | (2006.01) | |

(52) U.S. Cl.
CPC . *C09J 5/02* (2013.01); *B27J 5/00* (2013.01); *B27K 7/00* (2013.01); *B65D 39/0058* (2013.01); *B65D 2539/001* (2013.01)

(58) Field of Classification Search
CPC .......... B27K 7/00; B27J 5/00; B65D 39/0058; B65D 2539/001; C09J 5/02
See application file for complete search history.

(56) References Cited

U.S. PATENT DOCUMENTS 7,901,532 B2 *   3/2011   Bain ................. B29C 65/76
                                                 156/247

FOREIGN PATENT DOCUMENTS

| EP | 481155 A1 * | 4/1992 | ............... B27J 5/00 |
| FR | 354991 A | 10/1905 | |
| FR | 600134 A | 1/1926 | |
| FR | 631221 A | 12/1927 | |
| FR | 2759014 A1 * | 8/1998 | ............... B27J 5/00 |
| IT | VI20090190 A1 | 1/2011 | |

(Continued)

OTHER PUBLICATIONS

Machine translation of FR 600134 date unknown.*

(Continued)

*Primary Examiner* — John L Goff, II
(74) *Attorney, Agent, or Firm* — Christensen O'Connor Johnson Kindness PLLC

(57) ABSTRACT

Stopper intended for bottling still wines, characterized in that it includes cork strips laterally joined by a polyurethane binder so as to form a plurality of cork strips, the cork strips being disposed such that the thickness thereof is perpendicular to the axis of the stopper, at least one lateral cork strip joined by a polyurethane binder to each face of the plurality of cork strips revealing all cork strips, the lenticels possibly present in the cork strips extending parallel to the thickness of the strips while those in the lateral cork strips extend perpendicular to the thickness of the strips, such that all lenticels of the stopper are disposed perpendicular to the axis of the stopper in order to limit the variation in oxygen permeability from one stopper to the other.

8 Claims, 4 Drawing Sheets

(56) References Cited

FOREIGN PATENT DOCUMENTS

JP 4623902 B2 * 2/2011 ......... B01D 11/0203
WO WO-2011033485 A1 * 3/2011 ................ B27J 5/00

OTHER PUBLICATIONS

Machine translation of FR 2759014 date unknown.*
Machine translation of It VI20090190 date unknown.*
Machine translation of EP 481155 date unknown.*
Machine translation of JP 4623902 date unknown.*
Extended European Search Report dated Apr. 7, 2021, issued in corresponding European Patent Application No. 20306118.9, filed Sep. 29, 2020, 8 pages.

* cited by examiner

METHOD FOR MANUFACTURING STOPPERS INTENDED FOR BOTTLING STILL WINES AND CORRESPONDING STOPPERS

TECHNICAL FIELD

The technical field of the invention is cork stoppers, and more particularly, stoppers made of cork strips allowing monitoring the exchange of oxygen between a bottle and its environment.

STATE OF THE PRIOR ART

Cork is a natural, waterproof and light material, which comes from the bark of some species of oaks, such as cork oaks, which are typically found in countries around the Mediterranean, in Europe and in North Africa.

In particular, cork finds its use in the manufacture of stoppers, which are used to seal containers such as bottles containing liquids intended for consumption, in particular, still or sparkling wine, spirits or other beverages. The stoppers are produced either by casing cork planks or by reconstitution using cork crushed and sieved with polymers.

Cork is a material which is elastic, resilient, compressible, liquid impermeable and having a high coefficient of friction. The structure thereof offers a permeability to gases, including the exchange of oxygen useful for the maturation of the product in the bottle. The structure of cork stoppers from casing whose aesthetic is highly appreciated, is however very variable, resulting in the variability of this passage of oxygen.

Conversely, the reconstituted corks produced from granulated triturated cork, which are much more homogeneous in structure, have the major drawback in aesthetic terms to move away from the conventional visual of corks called "natural" corks cased directly in the cork plank. Finally, although the use of a polyurethane binder has shown, in support of very thorough technical files, its total suitability, the absolute absence of oligomers of very low molecular weight which can migrate into the content is not demonstrable. It emerges that some winemakers have fears about the growing use of these reconstituted corks.

Different documents have been published in an attempt to resolve both the aesthetic issue and the use of cork portions whose size or appearance does not allow extracting a natural cork stopper. Each document provides a technical solution to the use of a portion of the cork by seeking to visually come as close as possible to a traditional natural cork.

The profession has developed for a long time, cork stoppers referred to as 1+1 whose ends of which are made of cork slices and the central body of agglomerated cork granulate. Thus, the profession has exploited the cork referred to as "thin cork" which is the harvested portion of cork which is not thick enough to be able to be intended for the casing of natural stoppers. These slices are cased in the thin cork in the "horizontal" direction of the thickness of the cork as opposed to the "perpendicular" direction used for the casing of a natural cork. It is recalled that the cork is the bark layer of a cork oak. The bark thickens with the growth of the tree and comprises a set of wells and passages called lenticels for the supply of sap from the central trunk.

The consequence of resorting to the "horizontal" direction is that the lenticels, present inside the thin cork layer, pass perpendicularly through the slices leaving as many passage wells for oxygen at the origin of significant variations from one stopper to another. These are also potential passages for oligomers from the binder. In the case of champagne stoppers for which two slices are superimposed on the side in contact with the wine, the risk of the passage of undesirable volatile compounds is reduced but not eliminated by this superposition.

A publication has thus expressed doubts about the physical barrier to the migrations of compounds derived from the binder due to the presence of these lenticels (Mechanism of migration from agglomerated cork stoppers. Part 2: Safety assessment criteria of agglomerated cork stoppers for champagne wine cork producers, for users and for control laboratories, November 2003 Food Additives and Contaminants 20(10):960-71)

One aim of the invention is to solve a problem identified in the related art of the non-microagglomerated cork stoppers which is the great heterogeneity of the passage of oxygen from one stopper to another, this variation causing a difference in evolution of wines. It is therefore about making stoppers:

being visually close to traditional cork stoppers,
being homogeneous,
allowing controlling the passage of oxygen with a decreased standard deviation from one stopper to another
avoiding the contact of the wine with the polyurethane binder holding the different portions together, and
and guaranteeing an absence of contamination by anisoles from cork.

DISCLOSURE OF THE INVENTION

An object of the invention is a method for manufacturing stoppers intended for bottling still wines, comprising the following steps:

cork strips and lateral cork strips are made from cork such that the lenticels possibly present in the cork strips extend parallel to the thickness of the blades while those in the lateral cork strips extend perpendicular to the thickness of the strips, the cork having been previously debarked from the tree then boiled at least one parallelepiped is made by joining via a polyurethane binder, a plurality of cork strips as well as at least one lateral cork strip on each face of the plurality of cork strips revealing all cork strips, the polyurethane binder being polymerized by heating and under pressure, then at least one stopper is formed from the polymerized parallelepipeds such that the lateral cork strips are located at the ends of the stoppers.

The cork strips and/or the lateral cork strips can be inspected by an imaging technique before jointing so as to remove those having holes, dry veins or yellow spots.

Between making the blades and forming the parallelepipeds, a cleaning of the cork strips and the lateral cork strips can be carried out with at least one compound selected from boiling water, steam, a mixture of steam and alcohol, a mixture of steam and carbon dioxide, a mixture of steam and nitrogen, and supercritical carbon dioxide.

In order to clean the cork strips and the lateral cork strips by exposure to supercritical carbon dioxide, they can be disposed in an autoclave allowing reaching a pressure of 100 bars and a temperature of 60° C. either for at least two hours, or until obtaining a residual rate of 2,4,6-trichloroanisole of less than 0.3 ng/l.

When cleaning by exposure to supercritical carbon dioxide, at least one fine mesh cage can comprise activated carbon and is disposed between two cages comprising cork strips and/or lateral cork strips so as to avoid a recontamination.

The stoppers can be formed by stamping or machining parallelepipeds.

In order to make a plurality of cork strips, cork strips are glued with a polyurethane binder, then the cork strips are disposed until reaching a predetermined thickness, then the cork strips which are glued normal to the length of the strips are cut to obtain the plurality of cork strips.

The polyurethane binder can comprise thermo-expandable microspheres and/or wax microspheres.

In order to make a plurality of cork strips, steps can be carried out during which: cork strips are glued with a wax emulsion, then the elimination of the water comprised in the wax emulsion is carried out by drying, they are glued with a polyurethane binder then the cork strips are disposed until reaching a predetermined thickness, then the cork strips, which are glued normal to the length of the strips are cut to obtain the plurality of cork strips.

The predetermined thickness of the plurality of cork strips can be comprised between 6 and 30 strips per stopper formed in a parallelepiped.

A lateral cork strip can comprise a thickness different from the thickness of the cork strips.

Another object of the invention is a stopper intended for bottling still wines, comprising cork strips laterally joined by a polyurethane binder so as to form a plurality of cork strips, the cork strips being disposed such that the thickness thereof is perpendicular to the axis of the stopper, at least one lateral cork strip joined by a polyurethane binder to each face of the plurality of cork strips revealing all cork strips. The lenticels possibly present in the cork strips extending parallel to the thickness of the strips while those in the lateral cork strips extend perpendicular to the thickness of the strips, such that all lenticels of the stopper are disposed perpendicular to the axis of the stopper in order to limit the variation in oxygen permeability from one stopper to the other encountered in traditional cork stoppers.

BRIEF DESCRIPTION OF THE DRAWINGS

Other aims, features and advantages of the invention will become apparent on reading the following description, given only by way of non-limiting example and made with reference to the appended drawings wherein.

DETAILED DESCRIPTION

Figure 1:
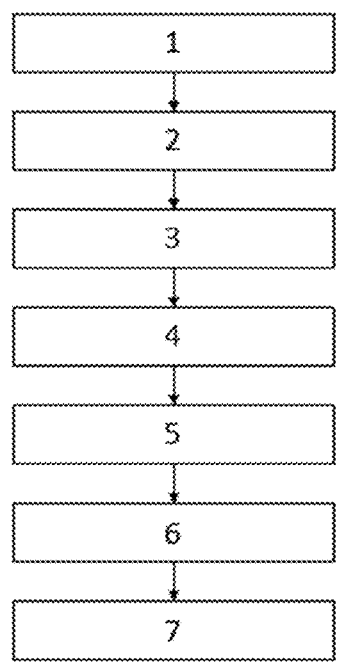
FIG. 1 illustrates the main steps of the manufacturing method according to the invention.

The manufacturing method according to the invention allows solving the technical problems identified in the related art and is illustrated in FIG. 1.

During a first step 1, cork strips 11 and lateral cork strips 13 are made from raised and boiled cork.

The cork strips 11 have a thickness comprised between 0.8 mm and 2 mm, and are cut such that the lenticels potentially present in these strips are implanted parallel to the thickness of the strips. The lenticels therefore potentially pass through the blades according to their thickness.

Likewise, the lateral cork strips 13 are cut such that the lenticels potentially present in these strips are implanted perpendicular to the thickness of the strips. No lenticels therefore pass through the thickness of these blades.

As will be seen below in the present description, the cork strips 11 and the lateral cork strips 13 are assembled in parallelepipeds wherein the stoppers are formed. The lateral cork strips 13 also allow limiting the contact of the wine with the used polyurethane binder, in particular in the absence of through lenticels.

In a particular embodiment, the cork strips 11 and/or the lateral cork strips 13 are subjected to an inspection by imaging, more particularly by optical observation and/or by the X-ray technique to identify the cork strips comprising dry veins, holes, or yellow spots. The presence of dry veins can make the affected cork strip brittle during compressions. The yellow spots denote a local rotting of the cork where a lot of anisoles are concentrated. If they are not filled with the polyurethane binder, the holes can constitute a reservoir of 2,4,6-trichloroanisole (acronym TCA) or of air modifying the permeability of the stopper. If they are filled with the polyurethane binder, they can help increase the relative amount of polyurethane compared to the relative amount of cork, such that the resulting stopper might not meet the ISO633 standard specifying that the relative amount of polymer binder in a stopper should be less than 35% m. The affected strips are thus removed.

The lateral cork strips 13 are also selected for their visual quality according to the traditional techniques of the related art.

During a second step 2, the cleaning of the cork strips 11 and the lateral cork strips 13 is carried out. This can be carried out with several compounds, in particular with at least one of boiling water, water vapor, water vapor combined with alcohol, water vapor combined with $CO_2$, water vapor combined with nitrogen and supercritical $CO_2$. It is recalled that a compound is said to be in a supercritical state when it is brought to a temperature above its critical temperature and/or to a pressure above its critical pressure. The critical temperature and the critical pressure differ for each compound.

In order to carry out such a cleaning of the cork strips 11 and of the lateral cork strips 13 before joining them, they are disposed in stainless steel cages whose bottoms consist of a fine mesh which can allow $CO_2$ to pass in the supercritical state. The cages are then placed in an autoclave allowing reaching a pressure of 100 bars and a temperature of 60° C. for several hours. By way of reference, it is recalled that $CO_2$ becomes supercritical beyond 73.8 bars and 31.1° C.

Several cages can be disposed on top of each other and intermediate cages containing activated carbon can be used in order to avoid recontaminating the cork with the volatile compounds extracted by the supercritical $CO_2$ and its co-solvent water to cages located in the upper levels. The cycle times are defined, according to the initial contamination rate, to result in a residual rate of 2,4,6-trichloroanisole (acronym TCA) of less than 0.3 ng/l.

Figure 2:
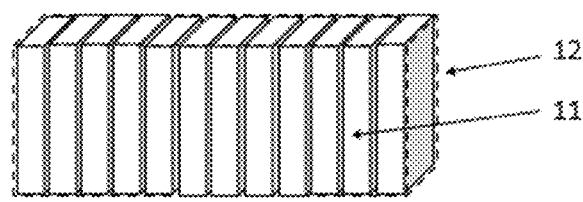
FIG. 2 illustrates a plurality of cork strips.

During a third step 3, pluralities 12 of cork strips are made by joining the cork strips 11, as illustrated in FIG. 2. In order to join them together, they are glued with a polyurethane binder optionally mixed with thermo-expandable or wax microspheres. Any method of coating the binder can be used, in particular by means of a gluing roller.

Such thermo-expandable microspheres are described in the patent EP 0496687. The microspheres allow reducing any risk of migration of the wine into the internal structure of the future stopper which may weaken its mechanical properties of elasticity.

The cork strips 11 are disposed until reaching the desired thickness (generally between 6 and 30 strips per stopper to be formed). The cork strips 11 are then cut normal to the surface thereof to obtain a plurality 12 of cork strips.

In a particular embodiment, with the aim of reducing the capacity of the corks to absorb wine in contact therewith, the third step 3 begins with a spraying of a wax emulsion (in particular, natural wax or beeswax) on the cork strips 11 then their drying in order to eliminate water comprised in the wax emulsion, in particular in a furnace. The cork strips 11 then obtained are subsequently glued with the polyurethane binder.

As in the first embodiment, the cork strips 11 are then disposed until reaching the desired thickness of the plurality 12 of cork strips (generally between 6 and 30 strips per stopper to be formed).

During a fourth step 4, the faces of each plurality 12 of cork strips are glued, revealing all cork strips 11 in a manner similar to the gluing carried out in the fourth step 4.

Figure 3:
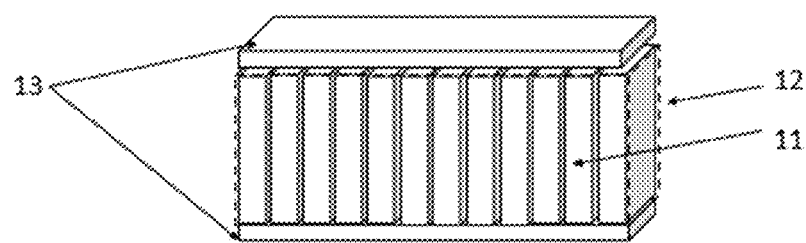
FIG. 3 illustrates the parallelepiped resulting from the polymerization.

One lateral cork strip 13, preferably 2 mm thick, is disposed opposite to each of these glued faces, so as to obtain a parallelepiped. FIG. 3 illustrates such a parallelepiped.

The gluing of the faces of the pluralities 12 of cork strips is thus preferred to the gluing of the lateral cork strips 13 to ensure that these strips, in contact with the content of the bottle, have not been exposed to the polyurethane binder. The lateral cork strips 13, whose lenticels are not through lenticels, thus act as a barrier to any potential migration of compounds derived from the binder.

The total height of the parallelepiped is made to correspond to a desired length of the stopper which will be stamped into this parallelepiped, such that at the ends of the stopper, referred to as mirrors, a non-reconstituted cork surface, formed by the lateral cork strip 13 which has been deposited, can be seen.

In a fifth step 5, the shaped parallelepipeds are disposed in a mold wherein they are compressed according to a volume compression ratio of 1.5 to 3 volumes in a volume according to the initial quality of the cork. The assembly is then heated to a temperature generally comprised between 80 and 120° C. for a duration time necessary for a good polymerization and, where appropriate, for the desired expansion of the microspheres. The heating can be carried out in an autoclave or a continuous furnace.

Figure 4:
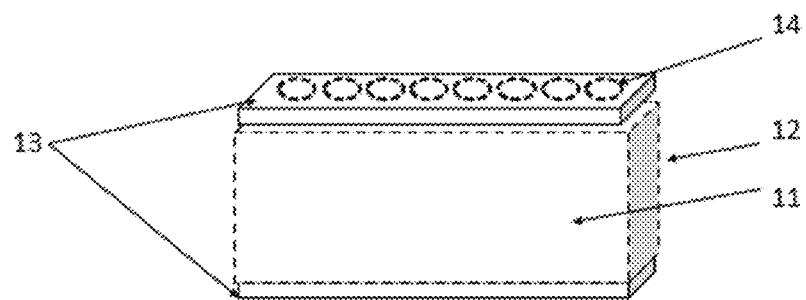
FIG. 4 illustrates the stamping of the polymerized parallelepiped.
Figure 5:
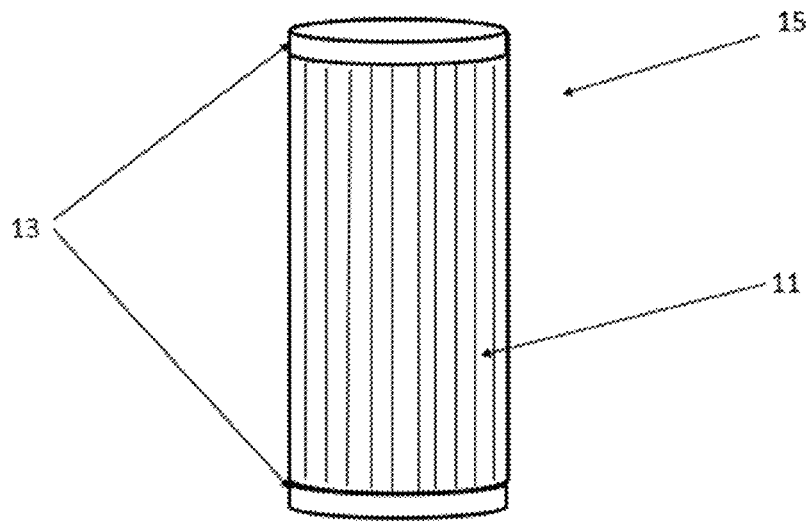
FIG. 5 illustrates the stoppers obtained by the manufacturing method.

In a sixth step 6, the polymerized parallelepipeds are stamped or machined to obtain stoppers with the desired diameters. The stoppers are then machined by a few tenths of millimeters to obtain a perfect conformation in the marketable format. FIG. 4 illustrates the stamping of the polymerized parallelepiped, with in particular the shape 14 representing the limit between the retained material and the removed material during the stamping. FIG. 5 illustrates the obtained stoppers 15.

Finally, in a seventh step 7, a washing of the obtained stoppers is carried out in order to eliminate any machining or stamping residues, then the quality thereof is checked by optical sorting and weighing. The compliant stoppers can then be marked by laser or induction and be satin-finished.

These different steps comprised in the seventh step 7 are applied as needed in an order specific to the desired finished product.

Studies of the evolution of the oxygen permeability of the stoppers thus produced have been carried out by chemiluminescence.

The used equipment is a Fibox 3 LCD Trace V6 from PreSens Precision Sensing GmbH. The system is composed of an emitter/receiver probe, which emits a blue luminous flux. This flux is directed to a sensor (also called a pad) glued inside a transparent bottle. These sensors are made of fluorescent compounds, which absorb the light energy sent by the probe then reconstitute it as red light. The measurement is based on the fact that the restitution time of this light is inversely proportional to the oxygen concentration in the bottle. The result is expressed in oxygen partial pressure inside the bottle ($PO_2$). This includes several advantages: it allows follow the kinetics of oxygen inlet from the stoppering until the end of storage in bottle, it is non-destructive, and finally, the measurement is simple to perform and can be done under different conditions (temperature, humidity, oxygen pressure gradient) reproducing those of a cellar or of the storage. This method is widespread in the industry and has already been the subject of numerous publications for a better control of oxygen supply upstream and during bottling (Ugliano et al., 2015).

The studied stoppers are stabilized beforehand in a climate chamber for 48 hours at 20° C. and 50% relative humidity. The bottles are transparent, with a CETIE ring, the profile of which has been checked compliant before use.

Before stoppering, the bottles have been equipped with Pst6 pads allowing oxygen pressure measurements up to 41 hPa (=41 mbar) with a detection limit of 0.02 hPa. The bottles stoppered with natural stoppers have also been equipped with Pst3 pads to measure more significant amounts of oxygen (up to 500 hPa). All bottles were blanketed with nitrogen before stoppering then stoppered under vacuum with a GAI stoppering device, model 4040, which allowed us to achieve residual oxygen contents of less than 0.1 mg/bottle (value subsequently subtracted in the results).

Figure 6:
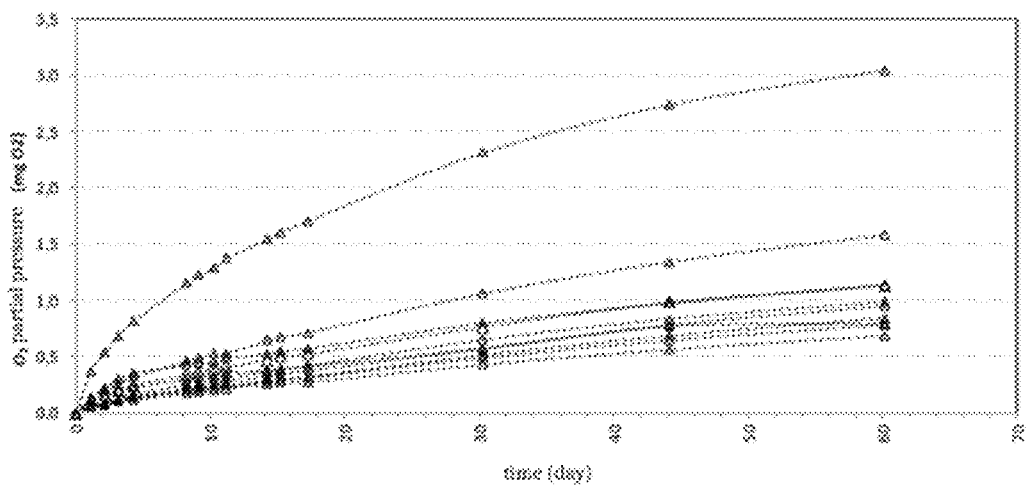
FIG. 6 illustrates the evolution of the oxygen partial pressure in mg of $O_2$ in the bottles as a function of the time elapsed in days for stoppers prepared according to the manufacturing process

FIG. 6 illustrates the evolution of the oxygen partial pressure in mg of $O_2$ in the bottles as a function of the time elapsed in days for stoppers prepared according to the manufacturing method described above comprising a stack of ten strips of 3 mm and strips of 1.5 mm at each end.

Ten stoppers have been the subject of measurements for this study. They have on average a partial pressure of 0.82 mg of $O_2$ after one month with a standard deviation equal to 0.56.

Figure 7:
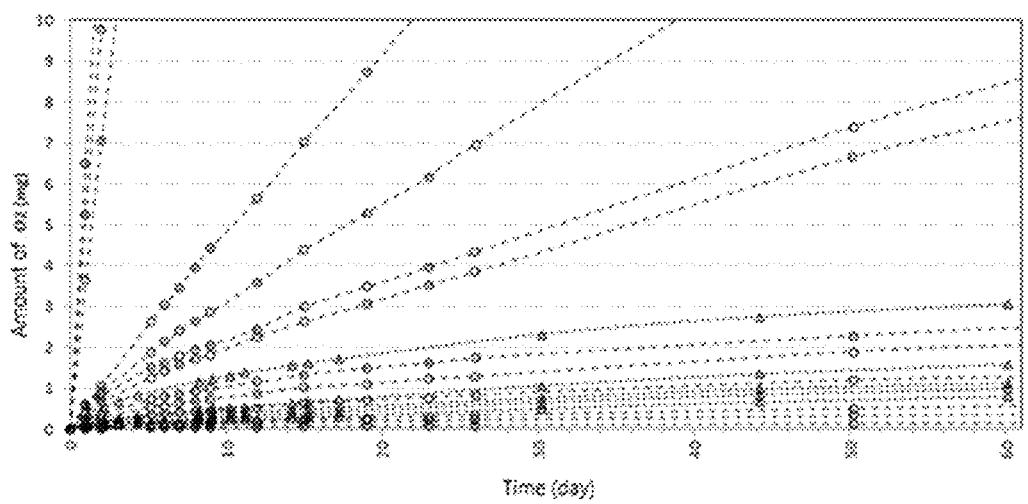
FIG. 7 illustrates the result of a comparative study between stoppers prepared according to the manufacturing method and the conventionally produced natural cork stoppers.

FIG. 7 illustrates the result of a comparative study between batches of stoppers prepared according to the manufacturing method (graphic key: Δ) and conventionally produced natural cork stoppers (graphic key: ○) will now be presented.

The natural cork stoppers produced by an ancestral manufacturing method have been selected for their high-end visual quality level involving a level of surface defects of the stopper reduced to a minimum.

Natural closures have on average a partial pressure of 4.7 mg of $O_2$ after one month with a standard deviation equal to 10.8.

The stoppers prepared according to the manufacturing method described above correspond to the stoppers whose permeability measurements are illustrated in FIG. 6 and therefore have a partial pressure of 0.82 mg of $O_2$ after one month with a standard deviation equal to 0.56.

It thus appears that the partial pressure of $O_2$ after one month for bottles stoppered by a stopper produced according to the manufacturing method described herein is significantly lower than that measured for bottles stoppered by a conventional solid cork stopper.

Moreover, the dispersion of the oxygen partial pressure measurements is much more restricted, such that the stoppers thus produced allow checking the admitted oxygen, and therefore the homogeneous aging of the content from one bottle to the other. In contrast, the conventional solid cork stoppers expose the content to a very significant variability in the oxygen admitted from one bottle to the other, leading to a great disparity in the aging of the same wine in these bottles.

These tests show that the stoppers produced by the manufacturing method thus solve the technical problem of the related art by demonstrating a low average permeability to oxygen, while exhibiting a reduced dispersion of the permeability.

In addition, the manufacturing allows ensuring the contamination by anisoles is reduced or absent and avoiding the contact of the wine with the polyurethane binder both at the end of the manufacturing method and during the aging of the bottle.

Finally, the structuring of the stopper with lateral cork strips, possibly selected by visual inspection or by X-ray, allows ensuring a visual appearance during the bottling or upon stoppering close to that of a solid cork stopper.

The invention claimed is:

1. A method for manufacturing stoppers intended for bottling still wines, the method comprising:
    making cork strips and lateral cork strips from cork such that lenticels possibly present in the cork strips extend parallel to the thickness of the cork strips while those in the lateral cork strips extend perpendicular to the thickness of the lateral cork strips, the cork having been previously debarked from a tree then boiled;
    making at least one plurality of cork strips by joining cork strips via a polyurethane binder, by spraying a wax emulsion on the cork strips and drying the wax emulsion to eliminate water therefrom, applying a polyurethane binder to the cork strips such that the cork strips are disposed on top of each other until reaching a predetermined thickness, and cutting the cork strips normal to their surface to obtain a plurality of cork strips;
    making at least one parallelepiped by joining at least one lateral cork strip on each side of the plurality of cork strips via a polyurethane binder so that the side of each cork strip of the plurality of cork strips is covered by at least one lateral cork strip, the polyurethane binder being polymerized by heating and under pressure;
    forming at least one stopper from at least one polymerized parallelepiped such that at least one of the lateral cork strips is located at an end of the at least one stopper.

2. The method for manufacturing stoppers according to claim 1, wherein the cork strips and/or the lateral cork strips are inspected by an imaging technique before jointing so as to remove those having holes, dry veins, or yellow spots.

3. The method for manufacturing stoppers according to claim 1, wherein between making the strips and forming the at least one parallelepiped, the method further comprises cleaning the cork strips and the lateral cork strips with at least one compound selected from boiling water, steam, a mixture of steam and alcohol, a mixture of steam and carbon dioxide, a mixture of steam and nitrogen, and supercritical carbon dioxide.

4. The method for manufacturing stoppers according to claim 3, wherein the method comprises cleaning the cork strips and the lateral cork strips by exposure to supercritical carbon dioxide and the cork strips and the lateral cork strips are disposed in an autoclave allowing reaching a pressure of 100 bars and a temperature of 60° C. either for at least two hours, or until obtaining a residual rate of 2,4,6-trichloroanisole of less than 0.3 ng/l.

5. The method for manufacturing stoppers according to claim 1, wherein the stoppers are formed by stamping or machining parallelepipeds.

6. The method for manufacturing stoppers according to claim 1, wherein the polyurethane binder comprises thermoexpandable microspheres and/or wax microspheres.

7. The method for manufacturing stoppers according to claim 1, wherein the predetermined thickness of the plurality of cork strips is comprised between 6 and 30 strips per stopper formed in a parallelepiped.

8. The method for manufacturing stoppers according to claim 1, wherein a lateral cork strip comprises a thickness different from the thickness of the cork strips.

* * * * *